United States Patent
Nowitz et al.

(10) Patent No.: US 7,308,464 B2
(45) Date of Patent: Dec. 11, 2007

(54) METHOD AND SYSTEM FOR RULE BASED INDEXING OF MULTIPLE DATA STRUCTURES

(75) Inventors: Jonathan Robert Nowitz, Seattle, WA (US); Jennifer Weis, Seattle, WA (US); Julie T. Trott, Seattle, WA (US); Srinivasan Sudanagunta, Seattle, WA (US); Austin David Dahl, Seattle, WA (US); Michael Gerald Maitlen, Tacoma, WA (US)

(73) Assignee: America Online, Inc., Dulles, VA (US)

( * ) Notice: Subject to any disclaimer, the term of this patent is extended or adjusted under 35 U.S.C. 154(b) by 0 days.

(21) Appl. No.: 10/625,141

(22) Filed: Jul. 23, 2003

(65) Prior Publication Data
US 2005/0027687 A1   Feb. 3, 2005

(51) Int. Cl.
*G06F 7/00* (2006.01)
(52) U.S. Cl. .................. 707/104.1; 707/100; 707/7
(58) Field of Classification Search ......... 707/1–104.1; 709/248; 725/9, 25
See application file for complete search history.

(56) References Cited

U.S. PATENT DOCUMENTS

| | | | |
|---|---|---|---|
| 4,484,303 A * | 11/1984 | Provanzano et al. ......... 712/37 |
| 6,151,624 A * | 11/2000 | Teare et al. ................. 709/217 |
| 6,549,922 B1 | 4/2003 | Srivastava et al. |
| 6,904,360 B2 * | 6/2005 | Pechatnikov et al. ....... 701/208 |
| 6,999,956 B2 * | 2/2006 | Mullins ......................... 707/2 |
| 2001/0044813 A1 | 11/2001 | Frank |
| 2002/0138449 A1 | 9/2002 | Kendall et al. |
| 2003/0033347 A1 * | 2/2003 | Bolle et al. ................ 709/107 |
| 2003/0110503 A1 * | 6/2003 | Perkes ......................... 725/86 |
| 2003/0115219 A1 * | 6/2003 | Chadwick ................... 707/200 |
| 2003/0126136 A1 * | 7/2003 | Omoigui ...................... 707/10 |
| 2004/0003402 A1 * | 1/2004 | McKenna, Jr. .............. 725/46 |
| 2004/0162871 A1 * | 8/2004 | Pabla et al. ................. 709/201 |

OTHER PUBLICATIONS

International Search report for WO04/23151.

* cited by examiner

*Primary Examiner*—Don Wong
*Assistant Examiner*—Linh Black
(74) *Attorney, Agent, or Firm*—Perkins Coie LLP

(57) ABSTRACT

A system and process for augmenting automated agents to search network based data stores generate a set of rules that describes the contents contained within structured data stores. This set of rules allows an automated agent to perform a focused search of a structured data store, thus eliminating searching for unnecessary content. The structure of the data store is defined and entities are categorized. Additionally, templates are created defining data, such as metadata fields, related to the entities. These definitions, categorizations, and templates are incorporated into the set of rules, which is utilized by the agent to search a data store on a network, such as a web site.

25 Claims, 7 Drawing Sheets

FIG. 3

| File Name: | 02132001_chershair.ra |
| --- | --- |
| Title: | Cher's Hair Throughout the Decades |
| Author: | Reporter X |
| Show: | Inside Hollywood |
| Copyright Date: | 2001 |
| Format: | RealMedia |
| Playback Rate: | 30 KB |
| Key Terms: | Cher, Wig, Dye |

312 → (left column)
314 → (right column)

METHOD AND SYSTEM FOR RULE BASED INDEXING OF MULTIPLE DATA STRUCTURES

FIELD OF THE INVENTION

The field of this invention relates generally to computer related information search and retrieval, and more specifically to a system and process for extracting data associated with a structured data store.

BACKGROUND

As background to understanding the invention, an aspect of the Internet (also referred to as the World Wide Web, or Web) contributing to its popularity is the plethora of multimedia and streaming media files available to users. However, finding a specific multimedia or streaming media file buried among the millions of files on the Web is often an extremely difficult task. The volume and variety of informational content available on the web is likely to continue to increase at a rather substantial pace. This growth, combined with the highly decentralized nature of the web, creates substantial difficulty in locating particular informational content.

Streaming media refers to audio, video, multimedia, textual, and interactive data files that are delivered to a user's computer via the Internet or other network environment and begin to play on the user's computer before delivery of the entire file is completed. One advantage of streaming media is that streaming media files begin to play before the entire file is downloaded, saving users the long wait typically associated with downloading the entire file. Digitally recorded music, movies, trailers, news reports, radio broadcasts and live events have all contributed to an increase in streaming content on the Web. In addition, less expensive high-bandwidth connections such as cable, DSL and T1 are providing Internet users with speedier, more reliable access to streaming media content from news organizations, Hollywood studios, independent producers, record labels and even home users.

A user typically searches for specific information on the Internet via a search engine. A search engine comprises a set of programs accessible at a network site within a network, for example a local area network (LAN) or the Internet and World Wide Web. One program, called a "robot" or "spider", pre-traverses a network in search of documents (e.g., web pages) and builds large index files of keywords found in the documents, where such an index of keywords is eventually used as a database for a search engine. Typically, a user formulates a query comprising one or more search terms and submits the query to another program of the search engine. In response, the search engine inspects the index files and displays a list of documents that match the search query, typically as hyperlinks. The user may then activate one of the hyperlinks to see the information contained in the document.

Typical search engines, however, have drawbacks. For example, many search engines are oriented towards textual information only. In particular, they are not well suited for searching information contained in structured databases (e.g. relational databases), voice related information, audio related information, multimedia, and streaming media, etc. Also, mixing data from incompatible data sources, as data stores, is difficult for conventional search engines.

Moreover, within the workflow of a search engine, data from many different data stores are brought together and processed into a database used during the course of a search query. Because such data and sources of such data may be vastly different, generalized processes of applying the same extraction and refinement processes to all obtained data may result in the database not having that much useful information.

There is a need, therefore, for defining rules for the workflow of a search engine affecting the extraction and data refinement processes of such a workflow in view of data associated with a data source that overcome the previously described drawbacks and disadvantages.

SUMMARY OF THE INVENTION

A method and system for generating rules describing a data store having content, including defining entities related to the content and categorizing the entities. The categorized entities are then incorporated into rules used for defining metadata associated with such a data store.

BRIEF DESCRIPTION OF THE DRAWINGS

The invention is best understood from the following detailed description when read in connection with the accompanying drawing. The various features of the drawings may not be to scale. Included in the drawing are the following figures:

FIG. 3 is an illustration of metadata associated with a media file entity in accordance with an exemplary embodiment of the invention.

DETAILED DESCRIPTION

Figure 1:
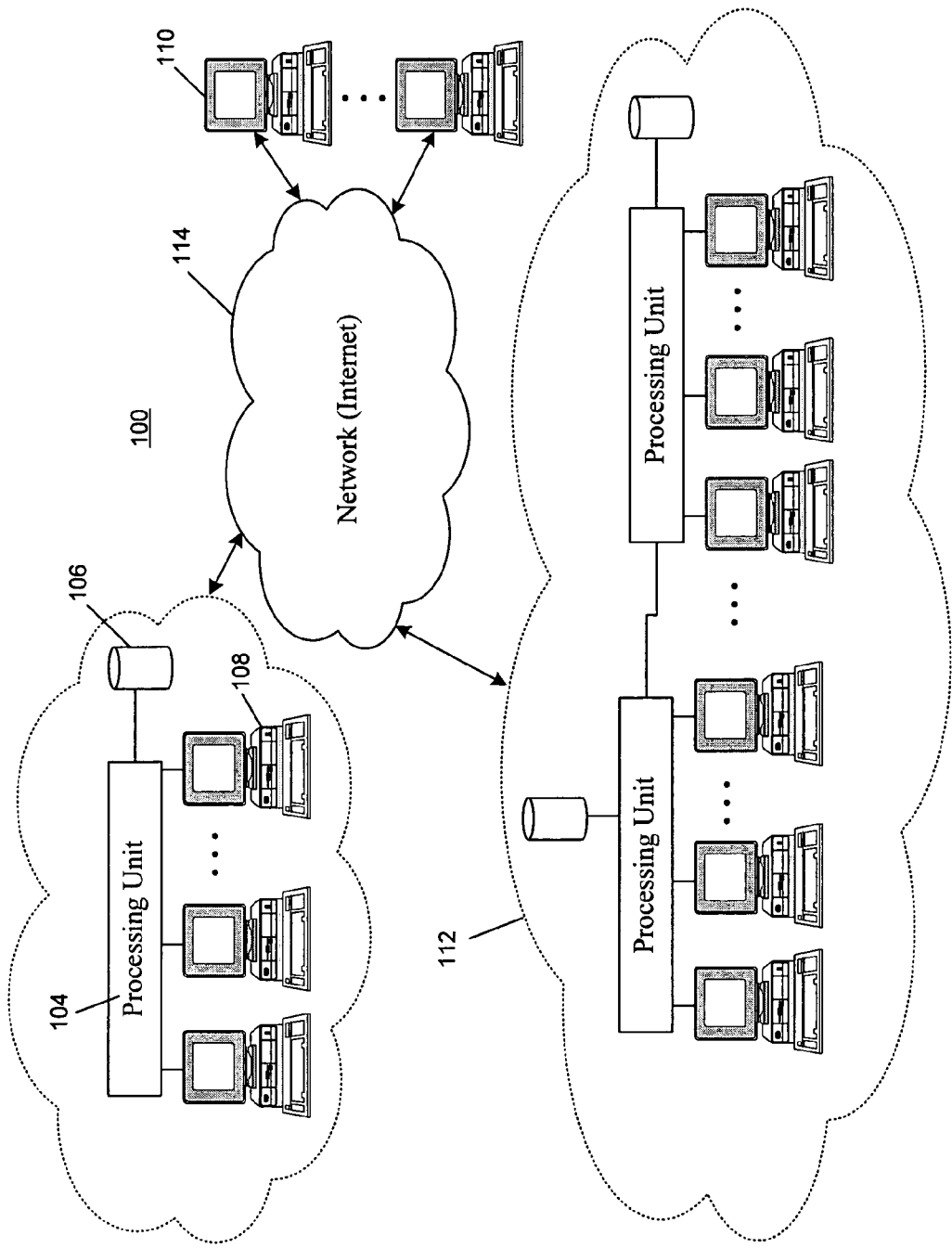
FIG. 1 is a stylized overview of an exemplary system of interconnected computer system networks in accordance with the present invention.

Although the following detailed description of the invention is described in terms of exemplary embodiments, it is not limited thereto. Rather, the appended claims should be construed broadly, to include other variants and embodiments of the invention, which may be made by those skilled in the art without departing from the scope and range of equivalents of the invention.

The Internet is a worldwide system of computer networks that is a network of networks in which users at one computer can obtain information from any other computer and communicate with users of other computers. The most widely used part of the Internet is the World Wide Web (often-abbreviated "WWW" or called "the Web"). An outstanding feature of the Web is its use of hypertext, which is a method of cross-referencing. In most Web sites, certain words or phrases appear in text of a different color than the surrounding text. This text is often also underlined. Sometimes, there are buttons, images or portions of images that are "clickable." Using the Web provides access to millions of pages of information. Web "surfing" is done with a Web browser; such as NETSCAPE NAVIGATOR® and MICROSOFT INTERNET EXPLORER®. The appearance of a particular website may vary slightly depending on the particular browser used. Recent versions of browsers have "plug-ins," which provide animation, virtual reality, sound and music.

The term "search" is used to denote a process of trying to locate information. Searching may be performed in several different contexts, for purposes of this application. For example, the subject matter of this application is related to search engines and the workflow of search engines. A user may perform a search for content located on the Internet by formulating and submitting a query to a search engine. The search engine then "searches" its databases for data that is germane to the search query.

Alternatively, a "search" may be performed for locating URIs of resources available through a communications network as the Internet. In this case, the term "search" may be used synonymously with the term "crawl" that defines a process of locating metadata and URI information from resources available through a communications network. "Crawling" may further mean that metadata and URI information related to a resource is extracted/harvested for use in the workflow of a search engine.

The present invention provides a mechanism for defining a directory of a structured data store and descriptive data contained therein, such as metadata, for objects, such a multimedia files and streaming media files. As used herein, the term "media file" includes audio, video, textual, multimedia data files, and streaming media files. Multimedia files comprise any combination of text, image, video, and audio data. Streaming media comprises audio, video, multimedia, textual, and interactive data files that are delivered to a user's computer via the Internet or other communications network environment and begin to play on the user's computer/device before delivery of the entire file is completed.

Examples of streaming media include songs, political speeches, news broadcasts, movie trailers, live broadcasts, radio broadcasts, financial conference calls, live concerts, web-cam footage, and other special events. Streaming media is encoded in various formats including REALAUDIO®, REALVIDEO®, REALMEDIA®, APPLE QUICKTIME®, MICROSOFT WINDOWS® MEDIA FORMAT, QUICKTIME®, MPEG-2 LAYER III AUDIO, and MP3®. Typically, media files are designated with extensions (suffixes) indicating compatibility with specific formats. For example, media files (e.g., audio and video files) ending in one of the extensions, ram, .rm, rpm, are compatible with the REALMEDIA® format. Some examples of file extensions and their compatible formats are listed in TABLE 1. A more exhaustive list of media types, extensions and compatible formats may be found at http://www.bowers.cc/extensions2.htm.

TABLE 1

| Format | Extension |
| --- | --- |
| REALMEDIA ® | .ram, .rm, .rpm |
| APPLE QUICKTIME ® | .mov, .qif |
| MICROSOFT WINDOWS ® MEDIA PLAYER | .wma, .cmr, .avi |

TABLE 1-continued

| Format | Extension |
| --- | --- |
| MACROMEDIA FLASH | .swf, .swl |
| MPEG | .mpg, .mpa, .mpl, .mp2 |
| MPEG-2 LAYER III Audio | .mp3, .m3a, .m3u |

Metadata, literally means "data about data." Metadata is data that comprises information that describes the contents or attributes of other data (e.g., media file). For example, a document entitled, "Dublin Core Metadata for Resource Discovery," (http://www.ietf.org/rfc/rfc2413.txt) separates metadata into three groups, which roughly indicate the class or scope of information contained therein. These three groups are: (1) elements related primarily to the content of the resource, (2) elements related primarily to the resource when viewed as intellectual property, and (3) elements related primarily to the instantiation of the resource. Examples of metadata falling into these groups are shown in TABLE 2.

TABLE 2

| Content | Intellectual Property | Instantiation |
| --- | --- | --- |
| Title | Creator | Date |
| Subject | Publisher | Format |
| Description | Contributor | Identifier |
| Type | Rights | Language |
| Source | | |
| Relation | | |
| Coverage | | |

Sources of metadata include web page content, uniform resource locators (URIs), media files, and transport streams used to transmit media files. Web page content includes HTML, XML, metatags, and any other text on the web page. As explained in more detail, herein, metadata may also be obtained from the URIs the web page, media files, and other metadata. Metadata within the media file may include information contained in the media file, such as in a header or trailer, of a multimedia or streaming file, for example. Metadata may also be obtained from the media/metadata transport stream, such as TCP/IP (e.g., packets), ATM, frame relay, cellular based transport schemes (e.g., cellular based telephone schemes), MPEG transport, HDTV broadcast, and wireless based transport, for example. Metadata may also be transmitted in a stream in parallel or as part of the stream used to transmit a media file (a High Definition television broadcast is transmitted on one stream and metadata, in the form of an electronic programming guide, is transmitted on a second stream).

Referring to FIG. 1 there is shown a stylized overview of a system 100 of interconnected computer system networks 102 and 112. Each computer system network 102 and 112 contains at least one corresponding local computer processor unit 104 (e.g., server), which is coupled to at least one corresponding local data storage unit 106 (e.g., database), and local network users 108. A computer system network may be a local area network (LAN) 102 or a wide area network (WAN) 112, for example. The local computer processor units 104 are selectively coupled to a plurality of media devices 110 through the network (e.g., Internet) 114. Each of the plurality of local computer processors 104, the network user processors 108, and/or the media devices 110 may have various devices connected to its local computer systems, such as scanners, bar code readers, printers, and other interface devices. A local computer processor 104, network user processor 108, and/or media device 110, programmed with a Web browser, locates and selects (e.g., by clicking with a mouse) a particular Web page, the content of which is located on the local data storage unit 106 of a computer system network 102, 112, in order to access the content of the Web page. The Web page may contain links to other computer systems and other Web pages.

The local computer processor 104, the network user processor 108, and/or the media device 110 may be a computer terminal, a pager which can communicate through the Internet using the Internet Protocol (IP), a Kiosk with Internet access, a connected electronic planner (e.g., a PALM device manufactured by Palm, Inc.) or other device capable of interactive communication through a network, such as an electronic personal planner. The local computer processor 104, the network user processor 108, and/or the media device 110 may also be a wireless device, such as a hand held unit (e.g., cellular telephone) that connects to and communicates through the Internet using the wireless access protocol (WAP). Networks 102 and 112 may be connected to the network 114 by a modem connection, a Local Area Network (LAN), cable modem, digital subscriber line (DSL), twisted pair, wireless based interface (cellular, infrared, radio waves), or equivalent connection utilizing data signals. Databases 106 may be connected to the local computer processor units 104 by any means known in the art. Databases 106 may take the form of any appropriate type of memory (e.g., magnetic, optical, etc.). Databases 106 may be external memory or located within the local computer processor 104, the network user processor 108, and/or the media device 110.

Computers may also encompass computers embedded within consumer products and other computers. For example, an embodiment of the present invention may comprise computers (as a processor) embedded within a television, a set top box, an audio/video receiver, a CD player, a VCR, a DVD player, a multimedia enable device (e.g., telephone), and an Internet enabled device.

In an exemplary embodiment of the invention, the network user processors 108 and/or media devices 110 include one or more program modules and one or more databases that allow the user processors 108 and/or media devices 110 to communicate with the local processor 104, and each other, over the network 114. The program module(s) include program code, written in PERL, Extensible Markup Language (XML), Java, Hypertext Mark-up Language (HTML), or any other equivalent language which allows the network user processors 108 to access the program module(s) of the local processors 104 through the browser programs stored on the network user processors 108.

Web sites and web pages are locations on a network, such as the Internet, where information (content) resides. A web site may comprise a single or several web pages. A web page is identified by a Uniform Resource Indicator (URI) comprising the location (address) of the web page on the network. Web sites, and web pages, may be located on local area network 102, wide area network 112, network 114, processing units (e.g., servers) 104, user processors 108, and/or media devices 110. Information, or content, may be stored in any storage device, such as a hard drive, compact disc, and mainframe device, for example. Content may be stored in various formats, such as a structured data store, for example, which may differ, from web site to web site, and even from web page to web page.

Typically, when harvesting a network for links to or metadata describing content, a web crawler or spider, crawls (searches) a network in a quasi-random fashion, following each web link it encounters. The spider uses the web link as a seed to search and retrieve information from a located resource (as a media file or data store of media files). This process is repeated with each "seed" or link to a resource. In the workflow of the crawling process, the results discovered by the web crawler are eventually parsed and submitted to an extraction agent that further extracts metadata from the results discovered during the course of a web crawl. More information about the specifics of the workflow of a search and retrieval system is described in FIG. 6.

During the course of a web crawl, a spider must consider the structure of an encountered data store. Specifically, the structure of a data store (e.g., a web site, server with media files, and the like) and the manner in which metadata may be extracted from such a data store may be different than the structure and processes used for a second data store.

As described herein, a data store is any site, on which information is stored. Examples of data stores include hard drives, optical discs, floppy discs, compact discs, flash cards, large-scale storage devices, and web servers on which are stored web sites and files. Data stores may be structured in accordance with various formats. Typically, the structure of the data store comprises a hierarchical format, wherein data is cataloged in accordance with the data stores specific hierarchy. Furthermore, a structured data store refers to a data store, wherein content therein is stored in accordance with a specific format, such as a relational database, for example.

Figure 2:
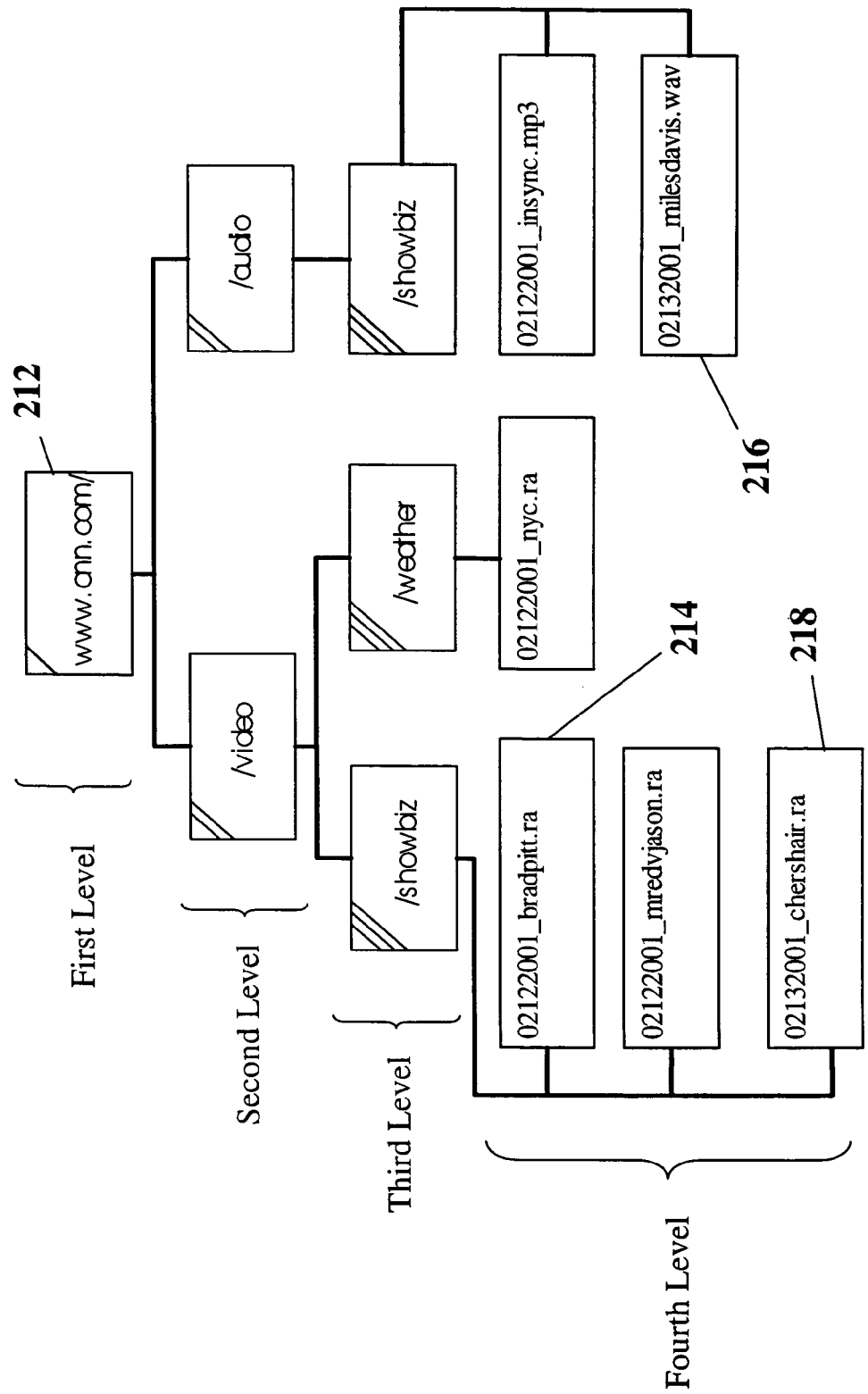
FIG. 2 is an illustration of the directory structure of the www.cnn.com (CNN) web site formatted in accordance with an exemplary embodiment of the invention.

An example of a structured data store in FIG. 2. FIG. 2 is an illustration of the directory structure of the www.cnn.com (CNN) web site. The structured data store of FIG. 2 is formatted into four levels. A structured data store may comprise any number of levels. Each level of a data store may comprise any number of links, objects, metadata, miscellaneous text, or any combination thereof, related to common content. An object is an entity available via the network. Examples of objects include multimedia files and streaming media files. A level may represent a web page, another web site, an object (e.g., multimedia, streaming media), metadata, miscellaneous text, or any combination thereof, encountered while conducting a crawl on a particular web site. For example, as shown in FIG. 2, the first level represents the home page 212 of the web site. Home page 212 comprises information such as the URI of the home page of the web site (i.e., www.cnn.com). The second level represents the next web page, or pages, that are accessible from the first level at that web site. Information at the second level is categorized in accordance with the type of media located at the web site. In FIG. 2, the second level comprises the media categories of video and audio. The third level represents the next web page or pages that are accessible from the second level at that web site. At the third level, information from the second level is further categorized into subcategories. As shown in FIG. 2, video media comprises the subcategories of showbiz and weather. The category of audio media comprises the subcategory of showbiz. The fourth level represents the next web page or pages that are accessible from the third level at that web site. At the fourth level, each subcategory of level three is further categorized by date and subject. As shown in FIG. 2, individual media files (objects) are categorized by their respective dates (in MMDDYYYY format), and by their respect subject. For example, entity 214, having the subheading of www.cnn.com/video/showbiz/02122001_bradpit.ra, represents a video media file (object), associated with the date of Feb. 12, 2001, which is relating to Brad Pitt. In comparison, entity 216, having the subheading of www.cnn.com/audio/showbiz/02132001_milesdavis.wav, represents an audio file (object), associated with the date of Feb. 13, 2001, related to Miles Davis.

Data stores also comprise metadata. For example, each of the media file entities shown in FIG. 2, such as 214, 216, and 218, comprise metadata. FIG. 3 is an illustration of the metadata associated with media file entity 218. The metadata shown in FIG. 3 comprise a metadata field template 312, and metadata terms 314. The metadata shown in FIG. 3 comprise information that defines and described the contents of the associated media file (i.e., entity 218). Accordingly, this metadata is associated with the video file referenced as www.cnn.com/video/showbiz/02132001_chershair.ra. The metadata shown in FIG. 3 comprise the metadata fields 312 of: File Name, Title, Author, Show, Copyright Date, Format, Playback Rate, and Key Terms. In accordance with an exemplary embodiment of the invention, this metadata field template 312 is used as a template for all the media files contained on this CNN web site. Thus, in accordance with the present invention, the structure of the data store for the CNN web site is defined and entities are categorized. Additionally, templates are created defining data, such as metadata fields. These definitions, categorizations, and templates are incorporated into a set of rules, which is utilized by an agent to search the web site.

Figure 4:
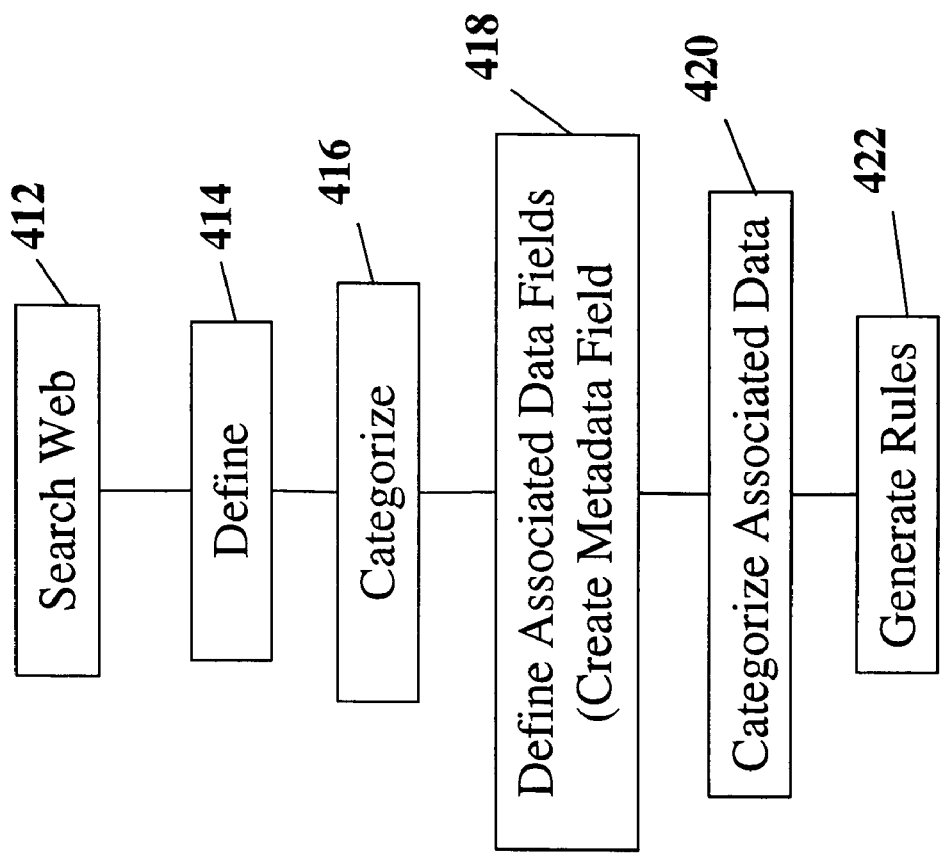
FIG. 4 is a flow diagram of an exemplary rule generation process in accordance with an embodiment exemplary of the present invention.

FIG. 4 is a flow diagram of an exemplary rule generation process in accordance with an embodiment of the present invention. At step 412, a web site is crawled for URI information that links to content. Any standard spider, robot, and/or other entity capable of locating and extracting URI information and/or metadata from a structured crawls the web site for URI information. Entities encountered at the crawled web site are defined at step 414. For example, the entities of video, showbiz, weather, audio, the homepage 212, and the other entities, were defined for the CNN web site, as shown in FIG. 2. Examples of other entities include images, streaming media, multimedia, and text, for example. The defined entities are categorized at step 416. In one embodiment of the invention, entities are categorized into levels. For example, as shown in FIG. 2, the entities of video and audio are categorized as being part of the second level of the structured data store.

Associated data fields are defined at step 418 and the associated data is categorized in accordance with the data fields in step 420. In an embodiment of the invention, associated data fields comprise metadata fields. For example, as shown in FIGS. 2 and 3, the associated data is metadata, and the metadata terms 314 are categorized in accordance with the metadata fields 312. Rules are generated at step 422. These rules incorporate the herein-described definitions and categorizations to aid an agent to search a data store. For example, the rules generated for the CNN web site depicted in FIGS. 2 and 3 incorporate the twelve entities shown in FIG. 2, categorized into four levels. Each media file is associated with the metadata fields 312 and the associated data terms (e.g., the metadata terms 314) are categorized in accordance with the metadata fields 312.

Figure 5:
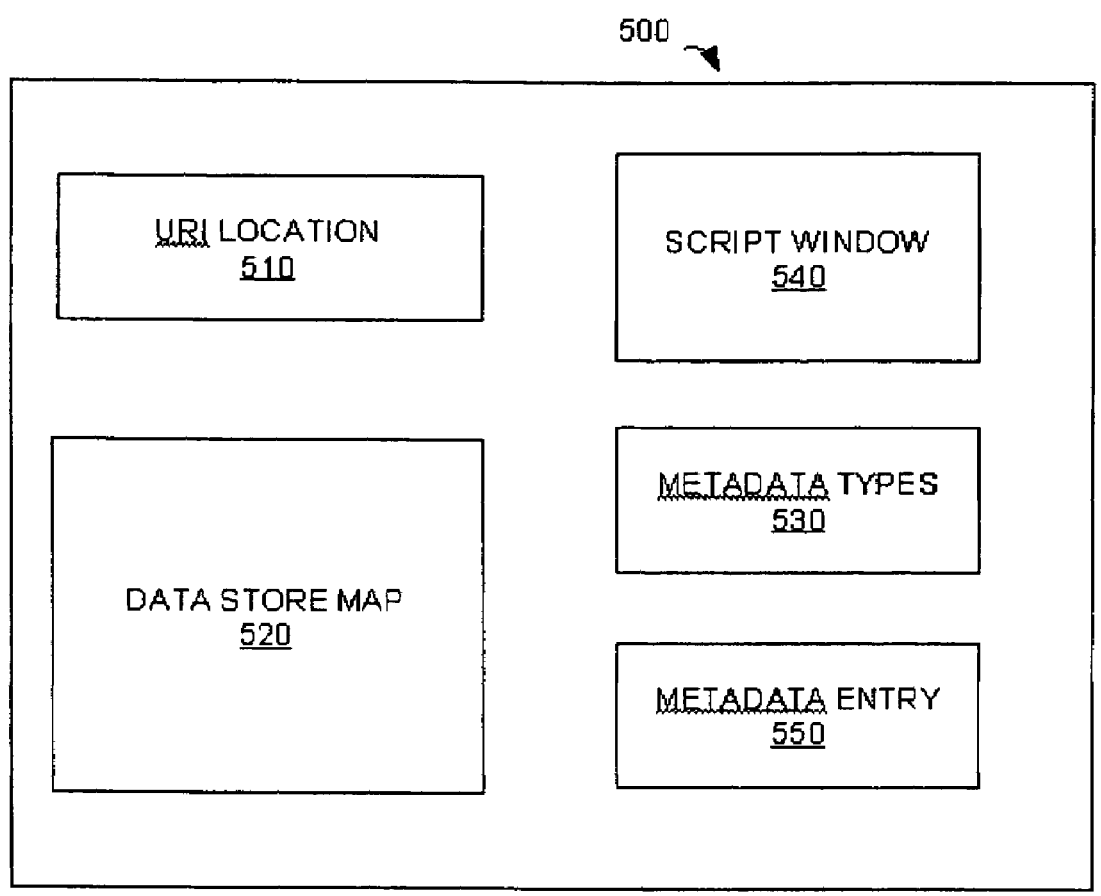
FIG. 5 is an illustration of a user interface 500 used for generating metadata and rules for extracting such metadata from a structured data store in accordance with an exemplary embodiment of the invention.

The rule generation system, as described above, may also be implemented using a user interface that provides an operator with a simplified interface for defining the metadata rules applicable for a structured data store. In FIG. 5, user interface 500 is presented for an extraction agent for extracting metadata from such information from a crawled data store. User interface 500 preferably operates within the workflow of search engine that has stored URI and metadata relating to a located structured data store. User interface 500 lists the URI of a currently selected data store. In this example, URI location 510 lists the URI of the web resources located at CNN.com, as seen in FIG. 2; this information being received from a database used in the workflow of a search engine or other resource that lists the located data store.

Once the URI is listed, data store map 520 shows the structure of the resource being defined by user interface 500. A data store map is defined as information used to define levels and sublevels of a located data store as a hierarchical structure such as a directory tree. The data store map information, received by user interface 500, is rendered graphically as data store map 520; FIG. 2. displays an example of a rendered data store map. In the present example, user interface shows CNN.com as comprising four levels. An operator, by using a control device with user interface 500, defines metadata associations with the structured data store by "clicking" levels in data store map 520 and assigning the level with metadata assigning tools. These associations are rules used by the extraction agent to identify the types of metadata found on a specific data store.

Metadata fields 530 is one tool used for assigning metadata and rules to selected levels in a structured data store. Metadata fields 530 are a series of commonly used metadata categories or subjects that are selectable by an operator to efficiently associate metadata with a structured data store. Examples of selectable metadata categories are displayed in TABLE II, as seen above. Additionally, other metadata categories or classes may be used upon the needs of the operator. For example, metadata types for multimedia based datastores include file type (audio, video, etc.) and subject matter (showbiz, news, weather, sports, history, trivia, etc). These metadata categories are presented in metadata fields 530 as selectable menu selections such as radio buttons, boxes, and the like. Optionally, many different metadata fields 530 may be associated with a data resource by scrolling through the metadata categories presented in metadata fields 530. When a web crawler performs a subsequent crawl of the data store; these associations are used in the workflow of the search engine to associate the defined metadata categories to the new objects found on such data stores.

In the present example, an operator selects the first level (as shown in FIG. 2) displayed in data store map 520. The operator then uses metadata fields 530 to associate the CNN.com data store with the metadata category "NEWS". All of the sub-levels below the first level will also be associated with the metadata category "NEWS", unless the operator decides to inactivate this option of globally assigning metadata. In the background of the process, User interface 500 records this association in a data file for the use in the workflow of a search engine. Hence, all objects found by a web crawler (or agent) on CNN.com will be identified with the metadata category "NEWS".

The operator, in the example, then defines the second level of CNN.com by assigning the data branch labeled "/video" with metadata category "VIDEO" and the data branch labeled "/audio" with metadata category "AUDIO", in accordance with the procedure listed above. This process may be repeated for all levels of the data store, upon the preferences of the operator.

The operator may also use a script tool to create filters for automatically defining metadata that correspond to file structures found in a structured data store. Script window 540 is an area of the user interface 500 that provides the operator with a prompt for entering in programming scripts for automatically parsing metadata from the file name or structure of a file. Preferably, Boolean operators within a simple conditional programming language are used to break down the metadata in a file name or the structure of a file into metadata categories. In the present case, the operator recognizes that all of the data files at CNN use a similar file format where metadata is stored in the file name. Specifically, in the fourth level of the CNN.com data store, an operator determines that the file names of multimedia resources are stored in the following manner "DATE_METADATA_FILETYPE".

The operator uses a script in script window 540, as known in the art, that upon finding a file name at CNN.com, the programming of the script is used by the user interface 500 to parse the file name. The first part of a file name, before the underscore, is defined as the metadata category DATE. The script then parses file name after the underscore, but before the period, into the metadata category PERSON. The last part of the file name, after the period, is defined as the metadata category known as "FILE TYPE". Using an example from FIG. 2, the file name "02122001_bradpitt.ra" is defined with the following metadata: DATE="02122001", PERSON="bradpitt", FILE TYPE="REAL AUDIO". This metadata is then stored in the data file used by the search engine, as defined above. Optionally, a metadata dictionary may be used in the workflow to improve the metadata, for example the metadata PERSON="bradpitt" would be changed to PERSON="Brad Pitt". This process may also be used for any type of object encountered at a data store, as text on a web page, and the like, in accordance with the principles of the present invention.

Figure 6:
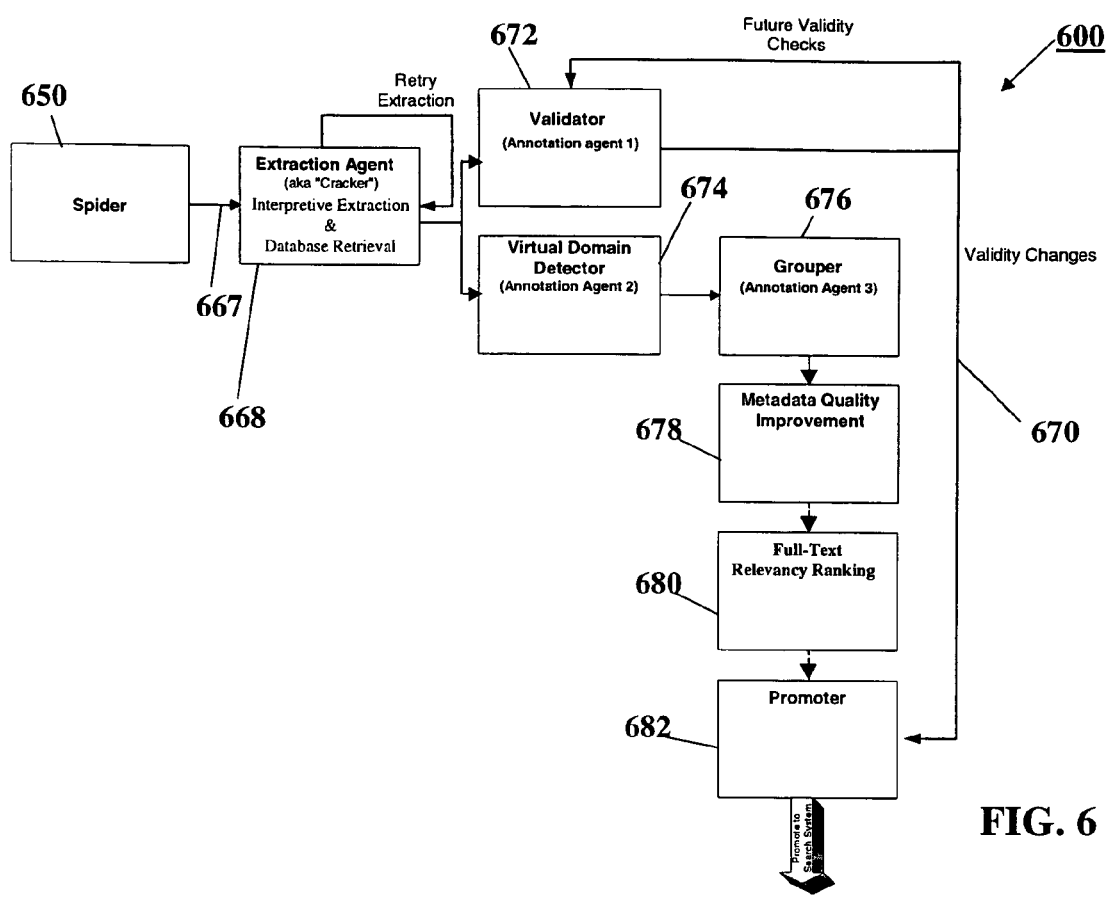
FIG. 6 is a functional block diagram of a workflow portion of a search engine in accordance with the present invention.

Metadata entry 550 provides an operator with a third tool to enter in metadata or rules associated with a structured data store. When selecting a level of the structured data store, in data store map 520, the operator types in via a prompt a metadata category and associates the category with specific type of metadata. For example, instead of using a script to define the file "02122001_bradpitt.ra", an operator may type in the associated categories and metadata manually as: DATE="02122001", PERSON="bradpitt", FILE TYPE="REAL AUDIO". These metadata associations are also stored in the data file for use by a search engine, for future searches. An operator may utilize any of the tools listed above for annotating a structured data store with metadata categories and metadata. FIG. 6 is a functional block diagram of a search and retrieval workflow system, designated 600, in accordance with the present invention. System 600 comprises a plurality of autonomous, interacting agents for collecting, extracting, enhancing, and grouping media metadata. Although system 600 depicts the agents performing in an exemplary order, agents may perform respective functions in any order. Each agent receives and provides data from and to data queues. Data residing on a data queue is available to all agents. In an exemplary embodiment of the invention, media files and associated metadata are stored in memory (e.g., a database) and assigned an identifier (id). The ids are enqueued, and the agents receive and provide the ids from and to the queues. Agents retrieve associated data (e.g., metadata) from memory to perform various functions, and store the processed data in memory (e.g., update the database).

Web crawler or spider 650 incorporates a process of seeding to search for media and related files. The use of spider 650 begins with the seeding of said spider 650 by adding terms used for locating and indexing of media during the course of a web crawl. The spider uses such discovered links to perform more searches. The input queue of the spider may be seeded with several types of information, such as the results of querying other search engines, manually generated sets of web page URIs.

Spider 650 uses seed URIs to search and retrieve (the HTML text from located web sites. The file name and MIME type of the web site are stored in memory. The text is parsed to look for links to other web resources associated with such media files. The HTML code of each web page is examined for anchor tags, form elements, known JavaScript functions, etc., to find other web resources associated with media. These newly found web resources are used as seeds for spider 650 for additional web crawls (added to the spider input queue) by repeating the search and retrieval steps of a web crawl using the new seeds.

The parsed results relating to the media are passed to extraction agent 668 via an extraction queue 667. Results not associated with the media are not pursued. The extraction queue 667 comprises URIs to be analyzed with respect to associated media metadata. The entries in the extraction queue 667 are a representation of a stream and all it's associated metadata, which may comprise media URIs, Web page URIs, Web page titles, Web page keywords, Web page descriptions, media title, media author, and media genre. Each queue entry added to the extraction queue is assigned a processing time and a priority. In an exemplary embodiment of the invention, each queue entry is given a processing time of "now" and the same default priority. The iterative seeding process increases the number of queue entries added to the extraction queue 667.

The extraction agent 668 comprises an interpretive metadata extractor and a database retriever. The extraction agent 668 distributes and performs enhanced metadata extraction of queue entries on the extraction queue 667. Queue entries contained in the extraction queue 667 are dequeued and distributed to media specific extractors. The extraction queue entries are dequeued and distributed in priority and time order. Preferably, the file extension, MIME type, and/or file identification for each queue entry is examined to determine the type of media format. The queue entry is than sent to the appropriate media specific extractor. Optionally, other types of data are used to determine the media format of a file (for example, the extraction queue 667 reads the metadata embedded in a media file to determine that it is a Real Media video file).

Next, queue entries sent to a specific media extractor are extracted by that specific extractor. Metadata extraction comprises the process of extracting metadata from the media file or from related media content (e.g., from the referring web page). Types of media specific extractors include multimedia and streaming extractors that can extract metadata from formats such as REALAUDIO®, REALVIDEO®, REALMEDIA®, APPLE QUICKTIME®, MICROSOFT WINDOWS® MEDIA FORMAT, QUICKTIME®, MPEG-2 LAYER III AUDIO, and MP3®, for example. As discussed in more detail herein, interpretive metadata extraction captures and aggregates metadata pertaining to a media file using metadata from the media stream, third party databases, the referring web page, and the URI, and enhances inaccurate metadata with known good metadata. An Internet stream object is created comprising the media file from the URI, metadata gathered during the crawling, metadata extracted from the media file and an identifier (id). The Internet stream object is then automatically stored in memory. In an exemplary embodiment of the invention, memory storage comprises providing the object to a relational database management system (DBMS) for storage and database management.

If the extractor 668 is unable to open the stream, the stream is said to be invalid. If determined to be invalid, the Internet stream object is assigned a later time and priority. The Internet stream object is requeued to the extractor, and the extraction process is repeated with at the later time and in accordance with the newly assigned priority. If extraction is valid, the Internet streaming object is queued and available to all agents.

A parallel part of the process determines if the accessible media file and the associated metadata links are valid. Validation comprises determining if the Web page comprises a link to a desired media file, and also determining if the desired media file works. In an exemplary embodiment of the invention, a streaming media file is retrieved and played to determine it is valid. Validation is performed periodically on all streams.

Annotation agent 678 captures and aggregates media specific metadata pertaining to the media (including multimedia and streaming media) from sources such as the media URI, the referring Web page URI, title, key words, description, and third party databases. Metadata, which may be inaccurate or "noisy," is extracted, parsed and indexed, compared with fields in known databases, and replaced with accurate metadata obtained from a valid (ground truth) database. Metadata is indexed and parsed into metadata fields and compared to other databases, such as a music or movie based database, whose accuracy is known (ground truth databases). Ground truth databases may be obtained from sources such as third party databases, previously created databases, and user entered databases, for example. Noisy fields are corrected and/or replaced with accurate data. New fields are added if appropriate.

For example, spider 650 finds a media file, of a music song. Metadata is extracted by extracting agent 668 using rules as defined above, which is parsed and indexed into the following metadata fields: the referring URI, the media URI, the title, and the performer of the song. The information contained in these fields is as follows.

TABLE 3

| FIELD | CONTENTS |
| --- | --- |
| The referring URI | www.singingfish.com/index.html |
| Media URI | www.singingfish.com/foobar.RAW |
| Title | "I am the Fishman" |
| Performer | Paul McCarpney |

The metadata fields are compared to a known database, such as a third party database, to compare contents of the metadata fields with the contents of the fields in the known database. In this example, assume a known database is located and contains the following indexed metadata.

TABLE 4

| FIELD | CONTENTS |
| --- | --- |
| Copyright | 1984 |
| Title | "We are the Fishmen" |
| Album | Rubber Suit |
| Music Genre | Light Rock |
| Performer | John Lennon |
| Performer | Paul McCarpney |

Annotation agent 678 adds the missing fields corresponding to the copyright, album, music genre, and composer, and adds the additional performer (i.e., John Lennon). The interpretive extraction 668 also corrects the title of the song from "I am the Fishman" to "We are the Fishmen" because the database comprises valid or authoritative metadata. Thus, prior to these enhancements, this media file could only be located if a user enter "Paul McCarpney" as the performer and/or "I am the Fishman" as the title. As a result of the enhancements provided by interpretive metadata extraction agent 668, a user may locate this media file also by searching for any of the resultant fields (e.g., the album name or the composer).

Not all databases queried are determined to be ground truth databases. Noisy metadata (metadata that needs to be cleaned up before being processed) are compared to potential ground truth databases to determine if a potential ground truth database qualifies as a ground truth database. Noisy metadata in each field (e.g., artist, title, album) is separated into keywords by transforming any connecting characters into white space. For example, "oops_i_did_it_again" is transformed to the cleaned up "oops i did it again". Connecting characters may include, for example, period ("."), underscore ("_"), backslash ("\"), forward slash ("/"), comma (","), asterisk ("*"), hyphen ("-"), and/or any other appropriate connecting character. The fields in the noisy metadata are used to perform a full-text query against one or more fields in the potential ground truth databases.

A score is calculated to quantify the degree of similarity between the noisy data (candidate metadata) and potential ground truth data (valid metadata). In an exemplary embodiment of the invention, the number of matching keywords in the fields being compared determines a score. For example, if the input query is "oops i did it" and two potential ground truth data records are "oops i did it again" and "did it again for you", the first score is 4 and the second score is 2. In an alternate embodiment of the invention, fields are also assigned weights, which are multiplied by the number of matching keywords. For example, the artist field may be assigned a weight of 3, and the copyright date field may be assigned a weight of 1. Thus, if two keywords match in each of the artist and copyright fields, the score for the artist field is 6, and the score for the copyright field is 2. Further, individual field scores may be added, averaged, or combined by any appropriate means to derive a cumulative database score. The scores are compared to a threshold value to determine if the potential ground truth database qualifies, or does not qualify as a ground truth database. If a database qualifies as a ground truth database, it is used by the interpretive extraction process as described herein. The threshold value may be predetermined and constant, or may be adaptively determined in accordance with the range of calculated scores.

Continuing with the workflow of the search engine, validator 672 dequeues entries from the queue in time and priority order. Validator 672 validates the media data by determining if the Web page comprises a link to a desired media file and also determining if the desired media file works. Validation is performed at a future point in time (e.g., check if the URI is still alive in 3 days), or alternatively, at periodic future points in time. If validity changes from valid to invalid, a notification is sent to promoter 682, as indicated by arrow 670. Validity may change from valid to invalid, for example, if the media file was removed from the linking URI.

The virtual domain detector 674 dequeues data from the queue in time and priority order. The virtual domain detector 674 looks for duplicate domains (field of the URI). If duplicates are found, they are identified as such and queued. The queued ids are available to all agents.

It is not uncommon for Web pages and multiple servers with different portions of a URI, e.g., different domains, to host the same media content. Further, the same media content may be available in different formats and bit rates. Grouper 676 analyzes and compares URIs in the database. Grouper 676 combines variants of the same media URI and creates a group in which all metadata for similar URIs are added to the group. URIs are analyzed to determine if they are variations of related files. For example, if two URIs share a very complex path that differs only in the file extension, the two URIs are considered to be related. Differences are eliminated by masking out tokens at the same relative location with respect to the original string.

Metadata quality improver 678 dequeues entries in time and priority order. Metadata quality improver 678 enhances metadata by adding fields of metadata based upon the contents of the fields in the URI of the media file and the contents of the fields in the URI of the referring Web page. The media file is then searchable under the subject heading of the added metadata. For example, a streaming media file may have a referring Web page at www.cnn.com. The metadata quality improver 678 adds the term "news" to the metadata associated with the streaming media file, because the datastore at CNN.com is related to news. As a result, the streaming media file is now searchable under the subject heading of "news". Rules, as defined above, are used to associate field contents with metadata. Virtual domain detector 674 applies rules to eliminate duplicate URIs that point to the same data. Grouper 676 uses rules to collect variants of media files with the same content but different encodings or formats (e.g., for multimedia and streaming media).

Figure 7:
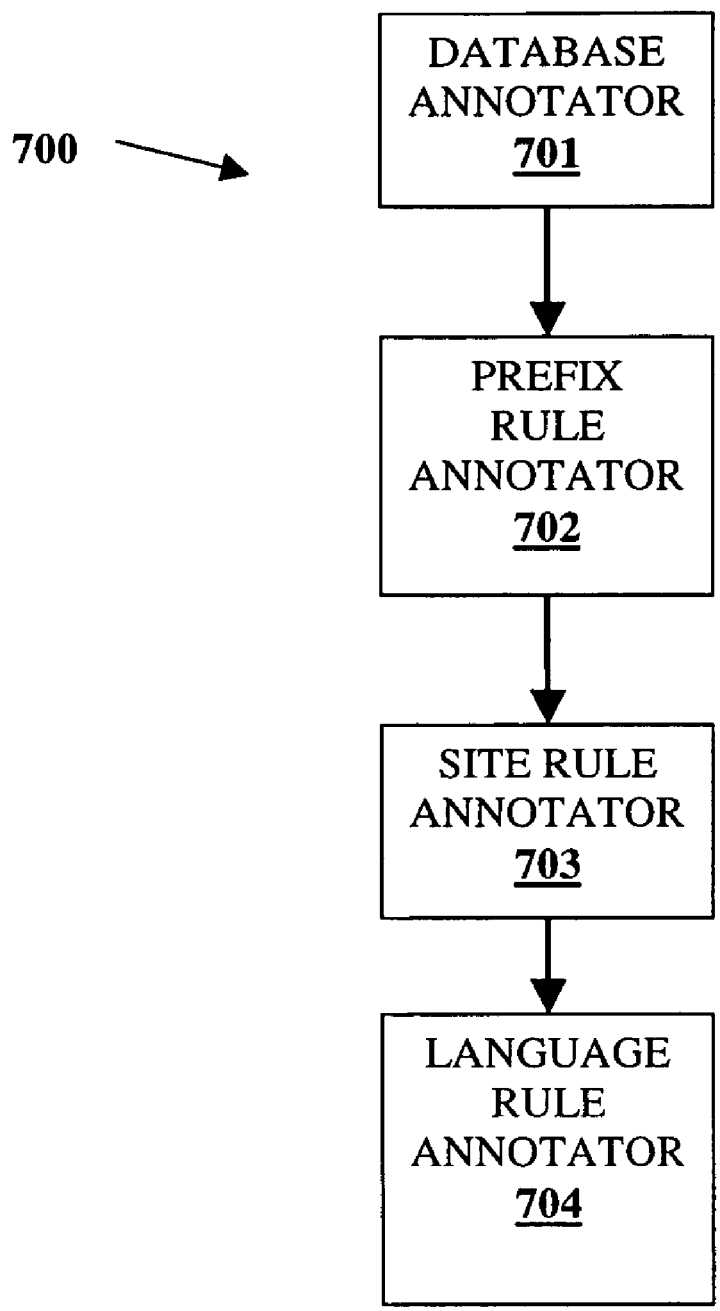
FIG. 7 is a functional block diagram of the metadata quality improvement portion of the workflow of a search engine in accordance with an exemplary embodiment of the invention.

FIG. 7 represents one aspect of the annotation portion of the workflow a search engine, in accordance with an exemplary embodiment of the invention. Specifically, metadata quality improvement process 700 represents an expanded application of the annotation processes used in annotator 678 for annotating metadata and metadata fields. The metadata quality improvement process 700 comprises prefix rule evaluation, genre annotation, and database information such as MUZE® (a commercial database containing metadata about music including song title, music author, and album information) prefix rule annotation 702, site rule annotation 703, and language rule annotation 704. Database annotator 701 uses generated rules which define metadata based on stored information from the database storing information such as discography and bibliographic information pertaining to media performers and media creators, as found in the MUZE® database. Prefix rule annotator 702 uses URI prefix associations to update metadata fields. Site rule annotation 703 uses generated rules 422, which are based on data associated with a structured data store, to classify and extract metadata. Language rule annotation 704 guesses the language and encoding of metadata by looking at other metadata based on language guessing rules.

Full-text relevancy ranker 680 comprises ranking and sorting data (e.g., media metadata) based on a variety of semantic and technical data fields (e.g., title, author, date, duration, bit rate, etc.). Full-text relevancy ranker 680 is depicted as part of the work flow architecture of system 600. This depiction is exemplary. In another embodiment of the invention, full-text relevancy ranker 680 is not part of the workflow architecture. Optionally, full-text relevancy ranker 680 is included as part of the workflow architecture (between metadata quality improver 678 and promoter 682).

Media metadata describing the semantics of the content are sorted and grouped into broad categories (e.g., who, what, where, when) within full-text relevance ranker 680. For example, artist of a streaming media file, type of streaming media, date the streaming media was created, and creation location of the streaming media. These broad categories are individually weighted along with technical parameters such as bit rate, duration, fidelity (audio sampling rate), etc. A relevance score is calculated for each URI in accordance with associated weights, as the next part of this process. The relevancy score is based upon several weighting criteria, such as the number of times a query term occurs in the metadata (term frequency), the number of links to the referenced Web site, number of terms between query terms in the text for the metadata, and the file type selected for a search (e.g., wav, MP3, ram, wma).

For example, suppose a user enters a search query comprising the terms "Mozart", "Magic Flute", and "Red". The full-text relevancy ranker 680, knowing that Mozart is a name of a composer (encoded rule), semantically associates Mozart with the who category and looks for "Mozart" in a field designated as WhoCreation. Magic Flute is recognized as a music composition and is semantically associated with the What category and looked for in the Title field. Weights of greater value are assigned to terms that are associated with semantic categories than to terms that are not associated with semantic categories. Thus, matches to "Mozart" and "Magic Flute" are assigned a greater weight, and accordingly a higher relevancy score, than the unrelated term "Red". Full-text relevancy ranker 680 also considers technical parameters in the calculation of the relevancy score. In the current example, if the term news were added to the search query, the full-text relevancy ranker 680 looks for news pieces about Mozart and the Magic Flute, rather than for a piece of music. In an exemplary embodiment of the invention, full-text relevancy ranker 680 searches for news articles by considering the duration of the indexed files. For example, the full-text relevancy ranker 680 knows that news pieces typically have a shorter duration than music files (an encoded rule). Accordingly, the full-text relevancy ranker 680 assigns a higher score to files with shorter lengths. If full-text ranker 680 is incorporated as part of the workflow architecture, the database is updated with the full-text relevancy ranked data and the associated ids are queued and available to all agents. If full-text relevancy ranker 680 is not incorporated as part of the workflow architecture, no associated ids are queued and made available to all agents. Rather, the results are made directly available to search systems and/or users.

The workflow proceeds with Promoter 682 formatting and prioritizing data for a target search system (e.g., search engine). Promoter 682 adds, deletes, and/or updates the data (including metadata) associated with a media file in accordance with the requirements of the target search system. The source of each piece of metadata is known. For example, the crawler provides the URL of the referring web pages, and the extractor provides the length of the stream. Promoter 682 also provides an indication to the search system of the trustworthiness of the media data. In an exemplary embodiment of the system, trustworthiness is determined in accordance with predetermined encoded rules. For example, promoter 682 may determine that metadata associated with the MUZE (R) rules is most trustworthy, and that metadata associated with the spider is less trustworthy. This hierarchy of trustworthiness is provided to the target search system in a compatible format. The target search system may then use this hierarchy of trustworthiness to conduct its search or pass the URIs on to the user.

A rule generation system and process in accordance with the present invention, is also applicable to structured data stores other than data stores associated with networks (e.g., Internet). For example, the present invention is applicable to an on-demand television system, wherein the movies and television programs are stored in a structured data store as media objects. The media objects comprise metadata, wherein the metadata complies with a known standard, i.e., MPEG. In accordance with another embodiment of the invention, the encoded rules for the on-demand television system are incorporated into a set of rules, which also apply to network based data stores. For example, the set of rules may comprise rules for accessing data on the on-demand television system data store and rules for accessing data on the network base data stores (e.g., CNN web site). Accordingly, a user may search, locate, and retrieve objects from completely unrelated mediums (e.g., on-demand television and a web site) and an automated agent can index a wide assortment of data stores with known rules. This flexibility provides the ability to catalog forms of media that are not widely used, but comply with known standards.

The present invention may be embodied in the form of computer-implemented processes and apparatus for practicing those processes. The present invention may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configures the processor to create specific logic circuits.

Although the invention is described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method in a computing system of associating metadata with a media entity comprising:
   identifying a first media entity located within a data store;
   receiving user input that identifies the first media entity as belonging to a distinguished category;
   receiving user input designating a portion of a map of the data store containing the first media entity as corresponding to the distinguished category;
   attributing metadata to the first media entity indicating that it belongs to the distinguished category;
   automatically identifying a plurality of media entities located within the designated portion of the map; and
   based upon the location of each of the plurality of media entities within the designated portion of the map, automatically attributing metadata to each of the plurality of media entities indicating that each of the plurality of media entities belongs to the distinguished category.

2. The method of claim 1 wherein identifying the first and second media entities includes crawling a web site.

3. The method of claim 1 further comprising selecting the distinguished category by examining a path of a URI at which the first media entity is identified.

4. The method of claim 1 further comprising selecting the distinguished category by examining a web site name at which the first media entity is identified.

5. The method of claim 1 wherein attributing metadata includes parsing a file name of the first or second media entity.

6. The method of claim 5 further comprising using a metadata dictionary to store a first string in the metadata when a second string is identified in the file name.

7. The method of claim 1 wherein attributing metadata includes prompting an operator to enter metadata based upon the distinguished category.

8. The method of claim 1 wherein attributing metadata includes extracting metadata from the first media entity.

9. The method of claim 1 further comprising comparing the specified metadata with known good metadata.

10. The method of claim 1 further comprising checking the validity of the identified media entities.

11. The method of claim 1 wherein the media entities are selected from the group consisting of text, audio, video, and images.

12. The method of claim 1 wherein the metadata conforms to one or more of a Dublin Core standard, an MPEG standard, or an XML standard.

13. A computer-readable medium whose contents cause a computing system to perform a method of associating metadata with a media entity, the method comprising:
   identifying a first media entity located within a data store;
   receiving user input that identifies the first media entity as belonging to a distinguished category;
   receiving user input designating a portion of a map of the data store containing the first media entity as corresponding to the distinguished category;
   attributing metadata to the first media entity indicating that it belongs to the distinguished category;
   automatically identifying a second media entity within the data store belonging to the distinguished category; and
   based upon belonging to the category, automatically attributing metadata to the second media entity indicating that it belongs to the distinguished category.

14. The method of claim 13 wherein identifying the first and second media entities includes crawling a web site.

15. The method of claim 13 further comprising selecting the distinguished category by examining a path of a URI at which the first media entity is identified.

16. The method of claim 13 further comprising selecting the distinguished category by examining a web site name at which the first media entity is identified.

17. The method of claim 13 wherein attributing metadata includes parsing a file name of the first or second media entity.

18. The method of claim 17 further comprising using a metadata dictionary to store a first string in the metadata when a second string is identified in the file name.

19. The method of claim 13 wherein attributing metadata includes prompting an operator to enter metadata based upon the distinguished category.

20. The method of claim 13 wherein attributing metadata includes extracting metadata from the first media entity.

21. The method of claim 13 further comprising comparing the specified metadata with known good metadata.

22. The method of claim 13 further comprising checking the validity of the identified media entities.

23. The method of claim 13 wherein the media entities are selected from the group consisting of text, audio, video, and images.

24. The method of claim 13 wherein the metadata conforms to one or more of a Dublin Core standard, an MPEG standard, or an XML standard.

25. A computer memory containing a data structure for associating metadata with a media entity residing in a data store having a map, comprising:
   metadata that, when attributed to a media entity, indicates that the media entity belongs to a distinguished category; and
   one or more rules for automatically identifying at least one identified media entity belonging to the distinguished category based on the at least one identified media entity residing in a user-designated portion of the map of the data store, at least one of the rules having been generated by:
      identifying a first media entity located within the data store;
      receiving user input that identifies the first media entity as belonging to the distinguished category;
      receiving user input designating the portion of the map of the data store containing the first media entity as corresponding to the distinguished category; and
      attributing the metadata to the first media entity indicating that it belongs to the distinguished category;
   such that the contents of the data structure are adapted for use to automatically associate the metadata with at least one media entity belonging to the category by:
   automatically identifying a second media entity located within the designated portion of the map; and
   based upon the location of the second media entity within the designated portion of the map, automatically attributing the metadata to the second media entity indicating that it belongs to the distinguished category.

* * * * *